United States Patent
Bonderson et al.

(10) Patent No.: US 8,606,341 B2
(45) Date of Patent: Dec. 10, 2013

(54) TWISTED TRACK INTERFEROMETER FOR PRODUCING MAGIC STATES

(75) Inventors: Parsa Bonderson, Santa Barbara, CA (US); Lukasz Fidkowski, Santa Barbara, CA (US); Michael Freedman, Santa Barbara, CA (US); Roman Lutchyn, Santa Barbara, CA (US); Chetan Nayak, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 13/337,378

(22) Filed: Dec. 27, 2011

(65) Prior Publication Data

US 2012/0258861 A1    Oct. 11, 2012

Related U.S. Application Data

(60) Provisional application No. 61/471,870, filed on Apr. 5, 2011.

(51) Int. Cl.
*G01F 23/24* (2006.01)

(52) U.S. Cl.
USPC .......................................................... 505/160

(58) Field of Classification Search
USPC ................ 505/160, 182, 191, 193, 170, 330; 356/450–521
See application file for complete search history.

(56) References Cited

U.S. PATENT DOCUMENTS

| | | | | |
|---|---|---|---|---|
| 5,130,766 | A * | 7/1992 | Arimoto et al. | 257/192 |
| 6,459,097 | B1 * | 10/2002 | Zagoskin | 257/31 |
| 7,453,162 | B2 * | 11/2008 | Freedman et al. | 257/798 |
| 2009/0079421 | A1 * | 3/2009 | Freedman et al. | 324/207.2 |
| 2010/0220336 | A1 | 9/2010 | Liu | |
| 2010/0264402 | A1 * | 10/2010 | Bonderson et al. | 257/14 |
| 2011/0161638 | A1 | 6/2011 | Freedman et al. | |

OTHER PUBLICATIONS

Hassler, et al., "Anyonic interferometry without anyons: How a flux qubit can read out a topological qubit", Retrieved at <<http://arxiv.org/PS_cache/arxiv/pdf/1005/1005.3423v3.pdf>>, May 2010, pp. 1-7.

Bravyi, et al., "Universal quantum computation with ideal Clifford gates and noisy ancilla", Retrieved at <<http://authors.library.caltech.edu/1053/1/BRApra05.pdf>>, Physical Review A, 71 (Art No. 022316), Feb. 22, 2005, pp. 1-14.

Bravyi, Sergey, "Universal quantum computation with the $v=5/2$ fractional quantum Hall state", Retrieved at <<http://authors.library.caltech.edu/5784/1/BRApra06.pdf>>, Physical Review A 73, (Art No. 042313), May 12, 2006, pp. 1-16.

(Continued)

*Primary Examiner* — Colleen Dunn

(57) ABSTRACT

A twisted track interferometer (TTI) for producing magic states is disclosed. The spin of ½-vortices may be exploited to produce magic states. The disclosed "twisted track interferometer" is a "topological twist" on the conventional Pabre-Pero interferometer adapted to topological superconductors. In the disclosed TTI, the probe particles may be Josephson vortices (JVs). JVs are estimated to be light and will tunnel more easily than Abrikosov vortices. Also, the disclosed TTI does not require multiple tunneling events. Rather, the JVs are propelled down thin insulating tracks within a 2D topological p-wave superconductor by a Magnus force generated by a tunneling supercurrent across the tracks. The JVs encounter tunneling junctions as they pass into the arms of the TTI.

20 Claims, 5 Drawing Sheets

(56) References Cited

OTHER PUBLICATIONS

Ekert, Artur, "From Interferometers to Quantum Computers", Retrieved at <<http://www.icts.res.in/media/uploads/Old_Talks_Lectures/Document/1265634590Ekert_QI_Sup_notes.pdf>>, Supplementary material, 2010, pp. 1-11.

Alicea, Jason, "Majorana fermions in a tunable semiconductor device", Dec. 10, 2009, pp. 1-10.

Bonderson, et al., "Plasma analogy and non-Abelian statistics for Ising-type quantum Hall states", Physical Review B 83, (Art. 075303), Feb. 7, 2011, pp. 52.

Bravyi, Sergey, "Universal quantum computation with the $v=5/2$ fractional quantum Hall state", Physical Review A 73, (Art 042313), Apr. 12, 2006, pp. 1-16.

Bravyi, et al., "Universal quantum computation with ideal Clifford gates and noisy ancillas", Physical Review A 71, (Art. 022316), Feb. 22, 2005, pp. 1-14.

Grosfeld, et al., "Observing Majorana bound states of Josephson vortices in topological superconductors", Aug. 18, 2011, pp. 1-10.

Qi, et al., "Chiral Topological Superconductor From the Quantum Hall State", Mar. 29, 2010, pp. 1-5.

Sau, et al., "A generic new platform for topological quantun computation using semiconductor heterostructures", Jan. 12, 2010, pp. 1-4.

\* cited by examiner

TWISTED TRACK INTERFEROMETER FOR PRODUCING MAGIC STATES

CROSS-REFERENCE TO RELATED APPLICATIONS

This application claims the benefit of provisional U.S. patent application No. 61/471,870, filed Apr. 5, 2011, the disclosure of which is incorporated herein by reference.

The subject matter disclosed herein is related to the subject matter disclosed and claimed in U.S. patent application Ser. No. 13/077,339, filed Mar. 31, 2011, and in U.S. patent application Ser. No. 13/111,828, filed May 19, 2011, each of which claims the benefit of provisional U.S. patent application No. 61/347,022, filed May 21, 2010 (collectively, "the 022 family"). The disclosures of the above-referenced patent applications are incorporated herein by reference.

BACKGROUND

It is known that all the so-called "Clifford operations" can be realized by braiding and/or interferometric measurement within Ising systems. The fractional quantum Hall state $$\nu = \frac{5}{2}$$

is thought to be an (Ising system)×(U(1) system). The U(1) sector does not affect braiding and interferometry. However, it is known to alter the statistics (e.g., "twist factors") of the quasiparticles. There have been many proposals for synthesizing superconductor/semiconductor (SC/SM) systems to realize a physical two-dimensional, chiral, topological, $(p_x+ip_y)$ superconductor (referred to herein as a "topological SC") whose topological characteristics are purely Ising.

To extend beyond Clifford operations to universal quantum computation, it is sufficient to produce so-called "magic" states:

$$\cos\left(\frac{\pi}{8}\right)|1\rangle + \sin\left(\frac{\pi}{8}\right)|\Psi\rangle \text{ or } \sin\left(\frac{\pi}{8}\right)|1\rangle - \cos\left(\frac{\pi}{8}\right)|\Psi\rangle,$$

which differ from one another by the Pauli operator $\sigma_y$. Given a magic state, Clifford operations, and measurement, one can build a $\pi/8$-gate, yielding, along with the Clifford gates, a universal gate set. An interferometer for producing magic states is, therefore, desirable.

SUMMARY OF THE INVENTION

As disclosed herein, the spin, $$\theta_\sigma = e^{\frac{2\pi i}{16}}, \text{ of } \frac{1}{2}\text{-vortices}$$

(referred to herein as "σ's") may be exploited to produce magic states. The disclosed "twisted track interferometer" is a "topological twist" on the conventional Fabre-Pero interferometer adapted to topological SC. It is well-known that there is significant non-topological physics in a topological SC (for example, the order parameter phase, Φ, magnetic B-fields, and screening currents). It may be desirable to account for such non-topological physics in the design of any device intended to extract topological information. The interaction energy of probe particles, for example, tends to wash out the interferometric signal if the interaction energy is not suppressed.

The twisted track interferometer (TTI) disclosed herein bears a mathematical relationship to the twisted interferometer disclosed and claimed in the 022 family, though, physically, it may be very different. As disclosed in the 022 family, the probe particles may be Abrikosov vortices, each of which may undergo multiple tunneling events to accomplish the desired "twist."

In the disclosed TTI, the probe particles may be Josephson vortices (JV) (also called fluxons). JVs are estimated to be light (e.g., having an effective mass less than one electron mass), and will tunnel more easily than Abrikosov vortices. Also, the disclosed TTI does not require multiple tunneling events. Rather, the JVs are propelled down thin (e.g., order one-nanometer) insulating tracks within a 2D topological p-wave superconductor by a Magnus force generated by a tunneling supercurrent $J_S$ across the tracks. The JVs encounter tunneling junctions as they pass into the arms of the TTI.

The disclosed twisted track interferometer may enable construction of a universal gate set for quantum computation on a topological superconductor substrate, and, therefore, may enable topologically protected production of magic states in a topological quantum computer based on two-dimensional topological superconductors.

DETAILED DESCRIPTION

Figure 1:
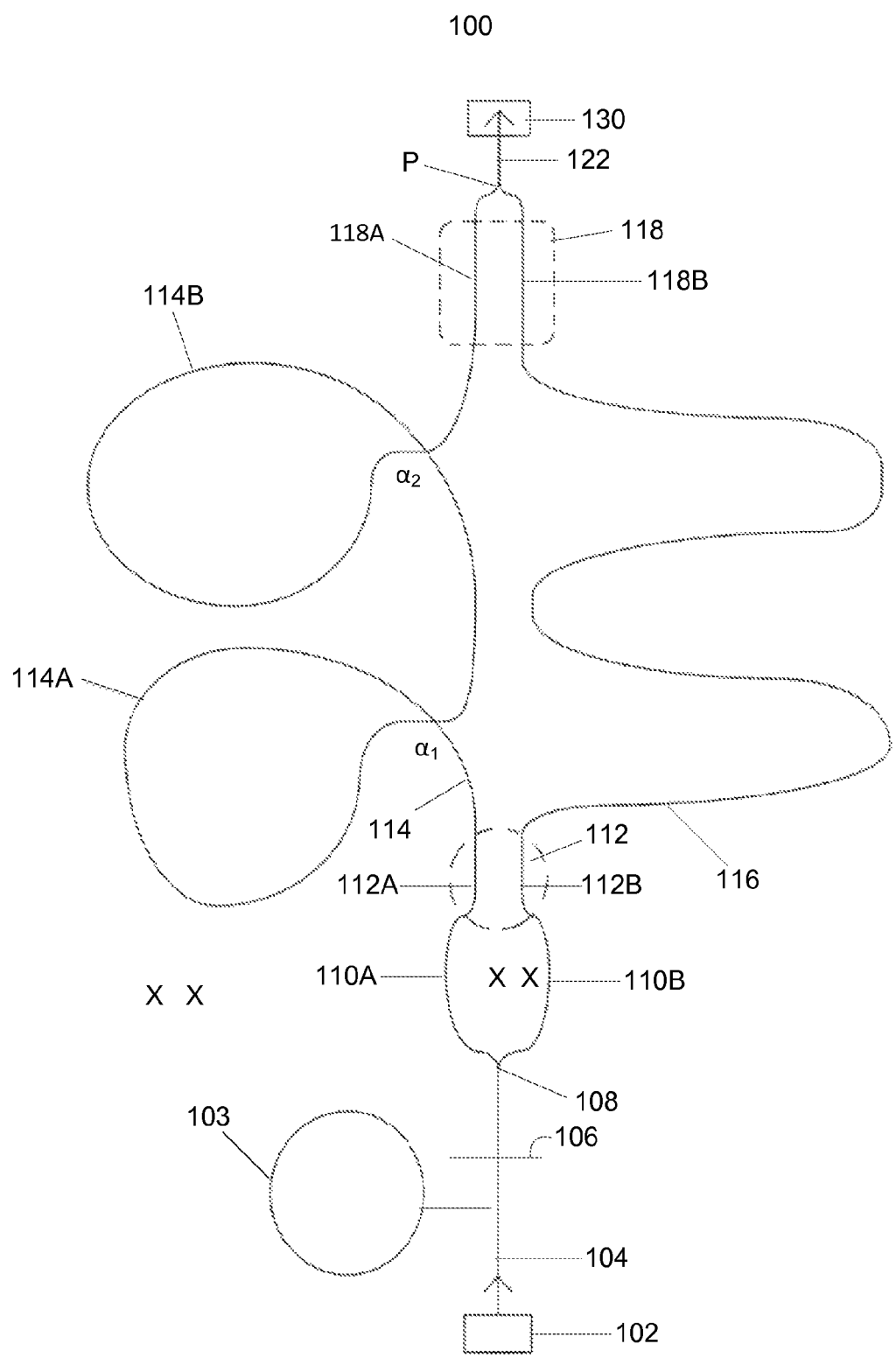
FIG. 1 depicts an example twisted track interferometer.

FIG. 1 depicts an example twisted track interferometer 100. The lines represent "tracks," which may be formed as narrow insulating defects in the superconductivity, Δ, of a 2D topological superconductor. The mathematical similarity with the 022 family is net ±double twist in one arm of the interferometer. Diagrammatic calculations show term-by-term in agreement (after adjusting by an overall phase) with that the twisted interferometry diagrammatic analysis provided in the 022 family.

As shown in FIG. 1, probe anyons (not shown), which may be JVs (a.k.a., "fluxons"), for example, may be generated in a topological SC 102. More generally, the probe anyons may be any physical realization of Ising anyons in the topological SC 102. The topological SC 102 may be any physical device capable of generating such anyons.

The probe anyons may be entered onto a first, or "entry," track 104 from the topological SC 102, or from a JV storage ring 103, or both. A more detailed description of a JV storage ring 103 is provided below in connection with FIG. 4. Thus, the fluxons may be generated in the topological SC 102, or imported from the storage ring 103.

The first track 104, which may be a straight track, as shown, is provided to separate the particles being measured from high-energy events needed to enter the JVs onto the track. The length of the first track 104 may be chosen such that the particles being measured are separated sufficiently from the high-energy events. A time-varying tunnel barrier 106 may be provided in the first track.

The probe anyons may travel along the first track 104 and encounter a scattering junction 108, which may be a balanced scattering junction. At this point, the tracks may split into two complementary tracks 110A, 110B. Along the complementary tracks 110A, 110B, a first half of a first qubit may be in an initial state, e.g., $$\frac{1}{\sqrt{2}}(|1\rangle - i|\Psi\rangle).$$

A second half of the first qubit may be sparsely encoded, absorbing the charge at infinity. The first qubit may be encoded in four anyons, such that each half of the qubit includes two anyons.

The complementary tracks 110A, 110B may be contoured to bend away from each other beginning at the scattering junction. The complementary tracks 110A, 110B may be contoured to close in on each other opposite the scattering junction, with the distance between them being reduced.

A pair of straight racks 112A, 112B, or "race track" 112, may extend from the complementary tracks 110A, 110B. A more detailed description of a race track 112 is provided below in connection with FIG. 3.

Beyond the race track 112, the tracks may assume significantly different contours. The left track 114 (as shown in FIG. 1) may define a twisted portion, which may include two "twisting loops" 114A and 114B, as shown. In each loop 114A and 114B, the probe anyons are physically spun 360° (i.e., "twisted"), for a total spin of 720°. From the mathematics provided in the 022 family, it should be understood that a spin of 720° is desirable to change the phase of the qubit between $|1\rangle$ and $|\Psi\rangle$.

The track 114 may loop back onto itself at a first angle $\alpha_1$ to close the first loop 114A. The track 114 may loop back onto itself at a second angle $\alpha_2$ to close the second loop 114B. The first angle $\alpha_1$ and the second angle $\alpha_2$ may each be much greater than zero. Note that the loops 114A and 114B may form any shape. Thus, the term "loop" as used herein should not be interpreted to imply that the loops must be circular or any other regular shape, though they could be.

The right track 116 is a delay track, having a total length sufficient to allow for the anyons to traverse the left track. The length of the right track 116 may be the same as the length of the left track 114, though it need not be. The length of the right track 116 may be chosen to provide any desired delay. Note that the probe anyons do not spin as they traverse the right track 116.

A straight track 118A extends from the left track 114. A straight track 118B extends from the right track 118. The pair of tracks 118A, 118B define a racetrack 118, which, again, is described in detail below in connection with FIG. 4.

The interferometer 100 may include only one racetrack (e.g., racetrack 112) before the twisting loops 114A, 114B. The interferometer 100 may include only one racetrack (e.g., racetrack 118) after the twisting loops 114A, 114B. Or the interferometer 100 may include both a racetrack (e.g., racetrack 112) before the twisting loops 114A, 114B and a racetrack (e.g., racetrack 118) after the twisting loops 114A, 114B.

The tracks 118A and 118b converge to form a single output track 120, which feeds into a flux measuring device 122. The flux measuring device 122 measures the current in the loop (i.e., the "flux"), which determines the final state of the qubit.

Figure 4:
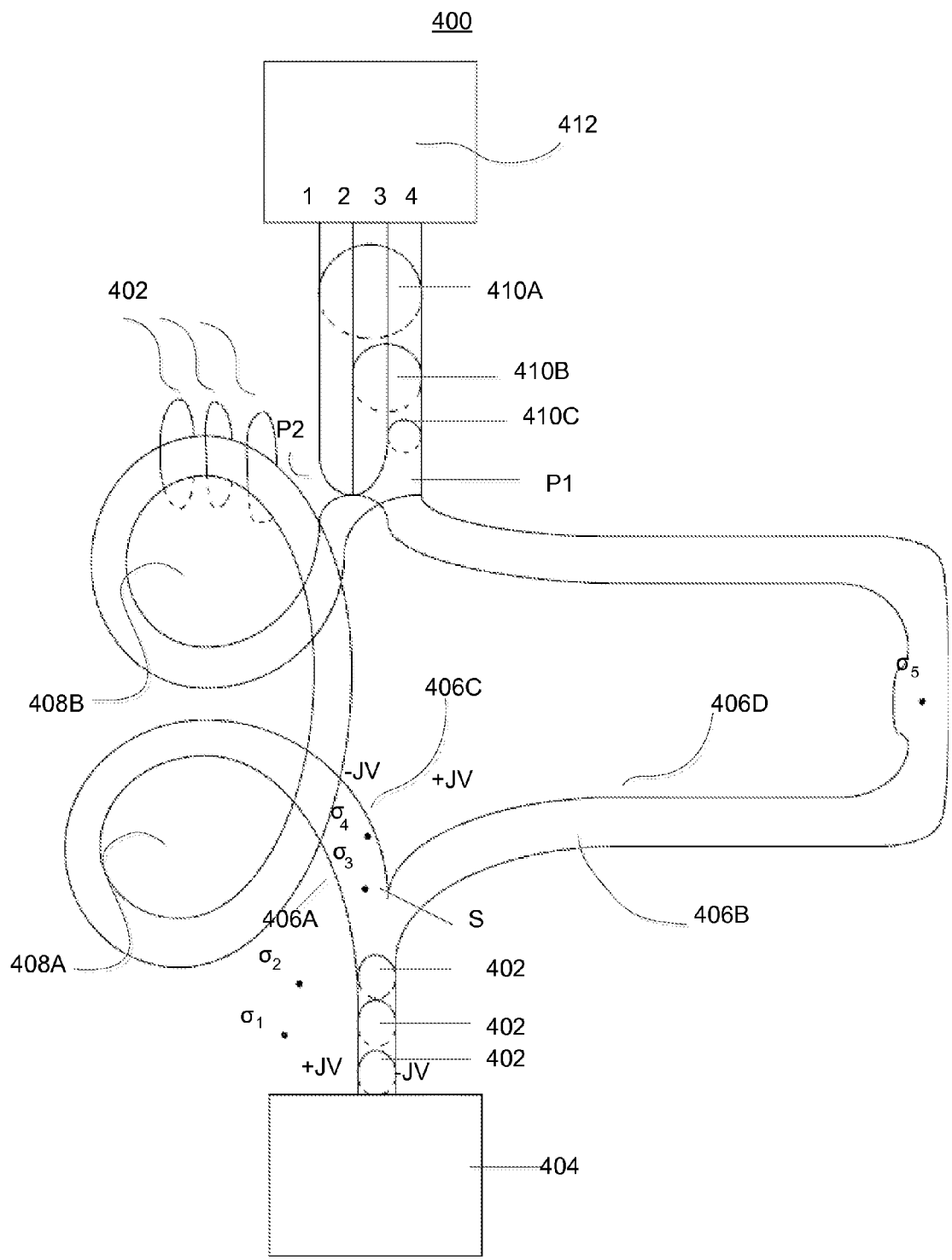
FIG. 4 depicts pairing ±JVs into excitons.

To preserve unitarity without the possibility of JV reflection from the "track fuse" point p, a JV sink may be provided near the "track fuse" point p for JVs traveling along each arm. Such a sink is not depicted in FIG. 1. It is represented in FIG. 4 as tracks into the detector at points 1 and 3.

Though the twisted track interferometer ("TTI") disclosed herein is mathematically similar to the twisted interferometer disclosed and claimed in the 022 family, there are a number of physical differences between the two. For example, the TTI uses Josephson vortices ("JVs") as probe anyons, rather than Abrikosov vortices. JVs, due to their smaller effective mass, provide increased output signal strength. Also, because the TTI employs insulating tracks to guide vortices, delicately tuned tunneling junctions can be avoided. And because trajectories along the twisted track are more deterministic than the previously disclosed multiple-tunneling design, the reduction of interferometric visibility due to undesired tunneling trajectories may be avoided $$\left(\text{by a factor estimated} \le \frac{4}{27}\right).$$

Figure 2:
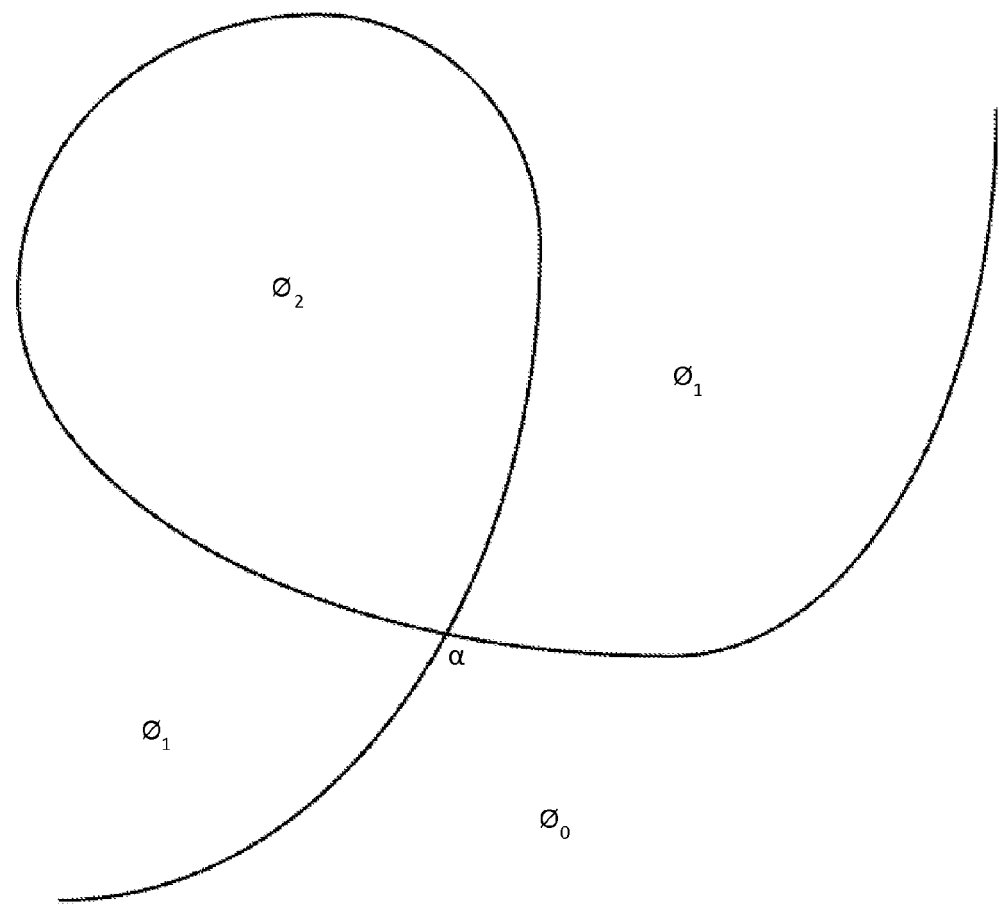
FIG. 2 depicts an immersed track.

It should be understood that JV tracks need not be imbedded. They may cross, as seen in the "immersed track" 200 depicted in FIG. 2 (that is, provided the supercurrent $J_S$ is arranged to tunnel from left to right as seen from the frame of the propagating JV). According to the Josephson equation, $I=I_0 \sin(\Phi)$. Accordingly, the desired phase differences may be achieved by producing phases $\pi \gg \Phi_2 > \Phi_1 > \Phi_0 > 0$ in the three complementary regions shown in FIG. 2. Effectively, the relative phases orient the track, so the JVs travel with the arrow of orientation. It may be desirable that the JVs do not "short-cut" the loop and turn right (with reference to FIG. 2). The amplitude for this process is exponentially surpassed by the stiffness of the order parameter $\Phi$ provided the angle marked $\alpha$ satisfies $\alpha \ll \pi$, as the shortcut would then impose a demanding constraint on the $\Phi$-field, and thus raise energy.

As described in the 022 family, twisted interferometry cannot operate in the low tunneling limit. In interferometry, the multiplicity of probe particles generally achieves fault tolerance with respect to certain design parameters. Because twisted interferometry typically requires mutual linking in space-time of probe world lines, it may be desirable for all probes to be sent in a short burst so that all probes passing through a twisting loop reside simultaneously on it at some point in time. Accordingly, it may be desirable to control the energy splitting between distinct left/right tunneling configurations (race tracks, for example), and the burst of probe anyons generated (via a JV storage ring, for example).

In electromagnetism, the base energy scales for magnetic interaction are much larger for magnetic flux than electric flux. The effective charge of a quantum ½-vortex is $$\Phi_0 = \frac{2\pi\hbar c}{2e}.$$

The ratio $$\frac{\Phi_0/4\pi}{e} = \frac{1}{4\alpha}, \text{ where } \alpha \text{ is the fine structure constant} \approx \frac{1}{137}.$$

In the magnetic case, therefore, typical interaction energies $E_B$ of the form $\frac{q_1 q_2}{\gamma}$ may be $\left(\frac{1}{4\alpha}\right)^2$, which may be about $4\times10^3$ times larger than corresponding electric energies $E_E$. For this reason, it may be desirable to minimize the JV-JV interaction energies, $E_{JV\text{-}JV}$, which will typically differ according to the arrangement of the JVs between the left and right arms of the twisted track interferometer.

Figure 3:
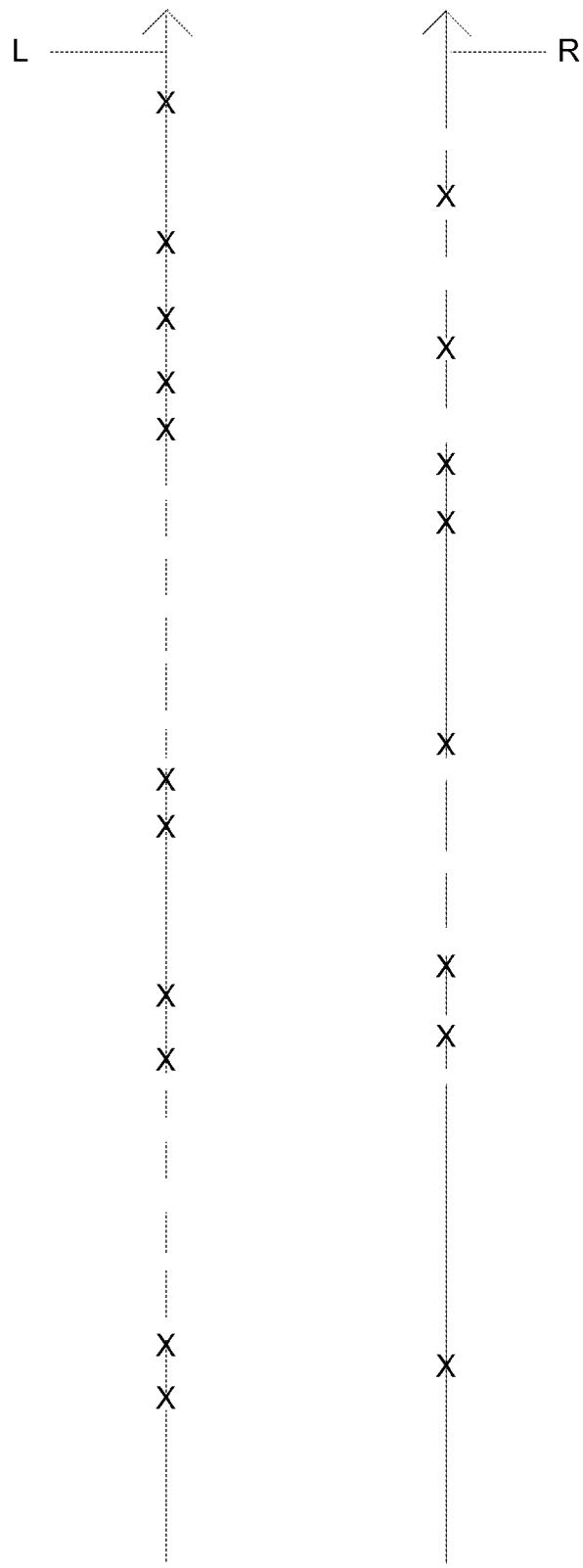
FIG. 3 depicts parallel tracks that effect JV-JV interaction.

FIG. 3 depicts an example race track 300. Generally, the uniform division between right and left arms (R and L, respectively) will have lower interaction energy than highly skewed divisions. This can be compensated, in part, by an opposite effect referred to herein as "race track."

The tracks R and L may be parallel to one another and close enough to one another for JV-JV interaction to exist. Through variations in the material structure of the tracks R, L, "slow" and "fast" regions may be alternatingly arranged in each track R, L. Fast racks are depicted in FIG. 3 as solid lines; slow tracks are depicted in FIG. 3 as solid lines. This is possible because the Josephson vertex group velocity $v_{JV}$ depends sensitively on many parameters, including track width, height, and the local london penetration depth (3D $\lambda_L$) of the bulk superconductor.

The effect of velocity variation on parallel tracks is repeated passing of JV (in the manner of cars on a freeway traveling in traffic each within their respective lanes). Passing events cost energy, and these events are more common in cases where the JVs are most uniformly divided between the two tracks R and L. This provides a simple mechanism to balance the opposite effect of less JV-JV interaction (in the uniformly divided case) when the tracks R and L are well separated.

FIG. 4 depicts apparatus for pairing ±JVs into excitons. As shown in FIG. 4, the linear weaknesses in the superconductivity of a topological chiral SC (which are referred to herein as "tracks" and represented in the figures as lines) can be formed as "double tracks" that are spaced some large multiple of the correlation length apart (but still a small fraction of a micron). Instead of individual probe vortices, numerous ±pairs of vortices called "excitons" may be sent down these parallel tracks. The vortices in ±pairs still may be topologically uncorrelated. Features such as track splitting, joining, and crossing, for example, may be engineered in the double track case analogously to the single track case described above in connection with FIG. 1.

By using excitons (shown as Xs in FIG. 4), X-X interaction may be dipolar and decays as $1/r^3$, which reduces the demands on screening that are present for JV-JV interactions, which decay only like $1/r$. In order to reduce $E_{JV\text{-}JV}$ to the $1/r^3$ power law associated with dipolar interactions, oppositely oriented pairs of JVs may be paired into magnetic field loops that interact as dipoles, essentially by doubling the apparatus depicted in FIG. 1.

As shown in FIG. 4, vortex loops 402, or "JV excitons," including ±JV pairs (+JV, −JV) may be generated in a topological SC 404. The loops 402 may be sent down a pair of parallel tracks 406A, 406B. At a point, S, two more parallel tracks, 406C and 406D, may be introduced, to form first and second pairs of tracks.

The first pair of tracks, 406A and 406C, may be contoured to form two twisting loops 408 A and 408B, which case the 720° rotation described above. The second pair of tracks, 406B and 406D, may be contoured to provide the corresponding delay, as described above.

The four σ qubits, $\sigma_1$, $\sigma_2$, $\sigma_3$, $\sigma_4$, shown in FIG. 4 may be "acted on," though they are not actually measured in this approach. To achieve the topological properties of a single JV probe, one half of the pair (e.g., $\sigma_3$, $\sigma_4$) may have its topological contribution neutralized. This may be accomplished by introducing a "5th" σ-particle, $\sigma_5$, to achieve the "odd-part" of the well-known "odd-even" effect of Majorana interference. As shown in FIG. 4, the $5^{th}$ particle, $\sigma_5$, neutralizes the topological contribution from −JV.

Beyond the twisting loop 408B, tracks 406B and 406C fuse at a first fusion point $P_1$ and emanate as a single track 4. Tracks 406A and 406D fuse at a second fusion point P2, and emanate as three parallel tracks 1, 2, and 3. The tracks 1, 2, 3, and 4 lead into a detector 412. The detector 412 counts flux loops 410B that bind tracks 2 and 4. In an example embodiment, the flux loops 410A binding tracks 1 and 4, and the flux loops 410C that bind tracks 3 and 4 are not measured.

Figure 5:
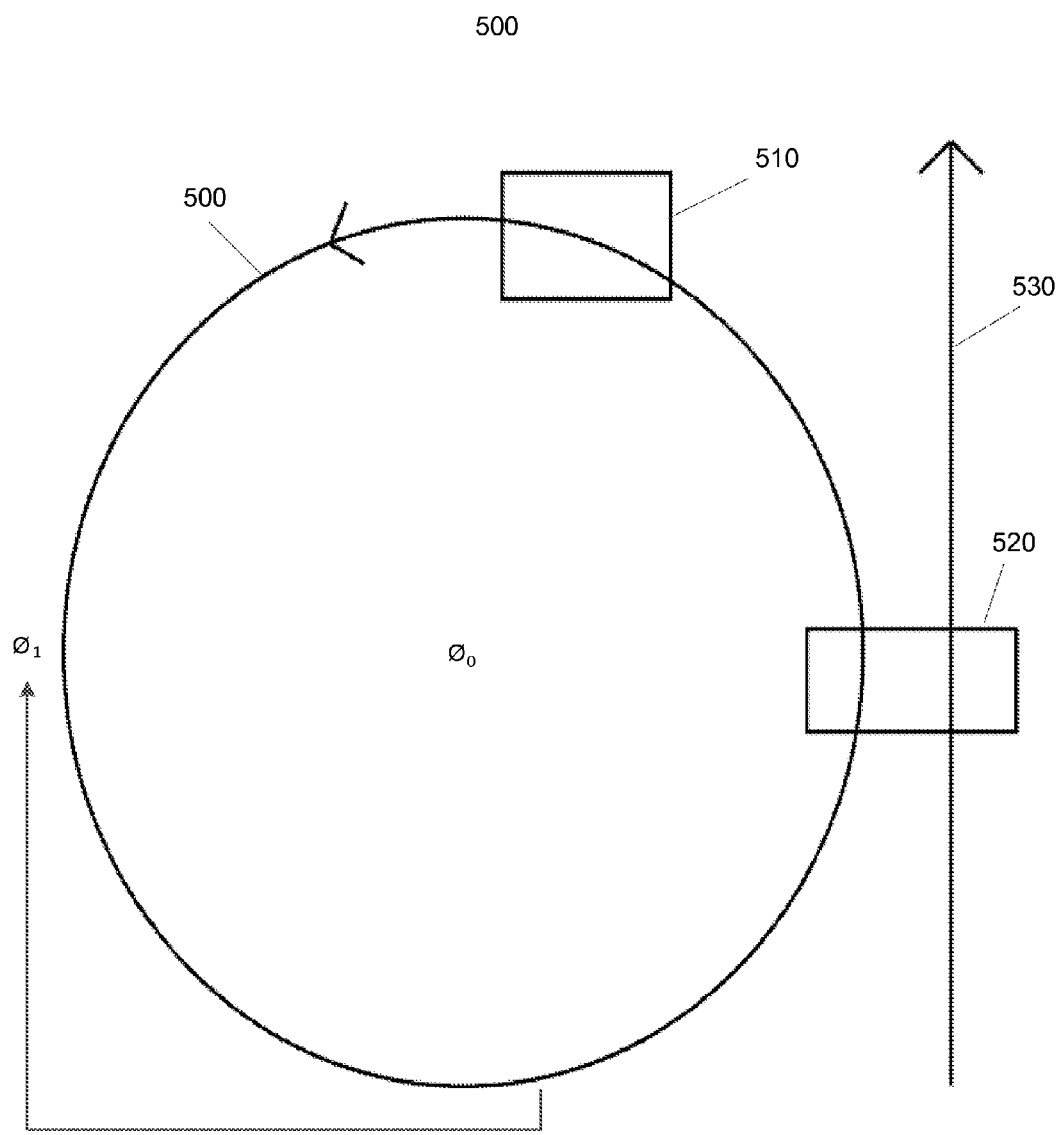
FIG. 5 depicts a JV storage ring and gating.

FIG. 5 depicts a JV storage ring 500 and gating. An internal/external phase differential $\Phi_1 > \Phi_0$ will keep in circulation n JVs, introduced by a flux solenoid into a circular track, i.e., a "ring" 500. Then, a precisely timed pair of electrostatic top gates 510, 520 may simultaneously break the ring and lower the tunneling barrier to a second track 530 leading to the TTI. The gate pulses may be very sharp (e.g., having frequency components of at least one gigahertz) to release all n JVs in a group. Accordingly, it may be desirable to well-separate this event in distance from all stored quantum information, and in particular from the qubit residing in the TTI.

In an alternate mode, the TTI can be operated in a limit where only a single probe JV is used. This may be desirable as there will be no JV-JV interaction to possibly degrade the performance of the TTI. In the single probe case, neither the "race track" nor pairing into excitons is required. However, the magic states precision depends on numerous probe particles, though a single probe passing through a perfectly tuned TTI will produce a perfect magic state. As a practical matter, use of a single probe will produce a magic state of fidelity 1−ϵ. So-called "magic state distillation" takes as input many magic states of fidelity 1−ϵ and, using only protected Clifford operations and measurements in the charge basis $\{|1\rangle, |\Psi\rangle\}$, produces as output a single magic state of fidelity 1−ϵ', where $\epsilon' \approx 35\epsilon^3$ when ϵ is small. The threshold for the initial ϵ is roughly ϵ<0.3 and is therefore not extremely demanding, though the asymptotic regime is not reached until $\epsilon \approx 10^{-3}$.

What is claimed:

1. A twisted track interferometer, comprising:
   a two-dimensional topological superconductor having a superconductivity, with first and second tracks that are formed as insulating defects in the superconductivity of the topological superconductor, wherein probe anyons are provided to the first and second tracks, the first track having at least one twisted portion, and the second track having a length sufficient to allow for the probe anyons to traverse the first track;
   a qubit encoded in four anyons, the qubit having an initial state, and
   a flux measuring device that determines a final state of the qubit after the probe anyons traverse the first and second tracks.

2. The twisted track interferometer of claim 1, wherein the probe anyons are physically spun sufficiently to change a state of the qubit between $|1\rangle$ and $|\Psi\rangle$.

3. The twisted track interferometer of claim 2, wherein twisted portion includes first and second loops in the first track, and wherein the probe anyons are physically spun 360° in each of the two loops for a total spin of 720°.

4. The twisted track interferometer of claim 1, wherein the probe anyons are Josephson vortices.

5. The twisted track interferometer of claim 1, wherein the probe anyons are physical realizations of Ising anyons in the topological superconductor.

6. The twisted track interferometer of claim 1, wherein the probe anyons are provided to the first and second tracks from a Josephson Vortex storage ring.

7. The twisted track interferometer of claim 1, further comprising an entry track that separates the probe anyons from high-energy events needed to enter the probe anyons onto the entry track.

8. The twisted track interferometer of claim 1, wherein the probe anyons do not spin as they traverse the second track.

9. The twisted track interferometer of claim 1, further comprising a pair of parallel tracks that are close enough to one another for interactions between probe anyons to exist, wherein slow and fast regions are alternatingly arranged in each of the parallel tracks, wherein the slow and fast regions are formed from variations in a material structure of the tracks.

10. The twisted track interferometer of claim 1, wherein the twisted track interferometer enables topologically protected production of magic states in a topological quantum computer based on two-dimensional topological superconductors.

11. The twisted track interferometer of claim 1, wherein the twisted track interferometer enables construction of a universal gate set for quantum computation on a topological superconductor substrate.

12. A Josephson Vortex (JV) storage ring, the JV storage ring comprising:
    circular track formed as an insulating defect in the superconductivity of a topological superconductor, the circular track having a tunneling barrier; and
    a pair of electrostatic top gates that simultaneously break the circular track and lower the tunneling barrier.

13. The JV storage ring of claim 11, wherein Josephson Vortices (JVs) are introduced into a circular track by a flux solenoid.

14. The JV storage ring of claim 12, wherein an internal/external phase differential $\Phi_1 > \Phi_0$ keeps JVs in circulation in the circular track.

15. The JV storage ring of claim 11, wherein the electrostatic top gates lower the tunneling barrier to a second track that is separated from the circular track.

16. The JV storage ring of claim 15, wherein the second track leads to an interferometric system.

17. The JV storage ring of claim 15, wherein the electrostatic top gates are controlled by gate pulses having frequency components of at least one gigahertz.

18. A method for producing magic states in a quantum computational system, the method comprising:
    forming first and second pairs of tracks in a topological chiral superconductor, the superconductor having superconductivity, each of the tracks corresponding to a respective weakness in the superconductivity of the superconductor, wherein the first pair of tracks is contoured to form two twisting loops, and the second pair of tracks is contoured to provide a delay;
    pairing ±Josephson Vortices (JVs) into excitons;
    sending the excitons down the pairs of tracks; and
    counting flux loops that bind a selected two of the tracks.

19. The method of claim 18, wherein interactions between the excitons are dipolar.

20. The method of claim 19, wherein oppositely oriented pairs of JVs are paired into magnetic field loops that interact as dipoles.

* * * * *